(12) United States Patent
Sasaki

(10) Patent No.: US 12,433,387 B2
(45) Date of Patent: Oct. 7, 2025

(54) CONTOUR DETECTION APPARATUS, PRINTING APPARATUS, CONTOUR DETECTION METHOD AND STORAGE MEDIUM

(71) Applicant: CASIO COMPUTER CO., LTD., Tokyo (JP)

(72) Inventor: Masaaki Sasaki, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 403 days.

(21) Appl. No.: 17/879,621

(22) Filed: Aug. 2, 2022

(65) Prior Publication Data

US 2023/0044135 A1 Feb. 9, 2023

(30) Foreign Application Priority Data

Aug. 3, 2021 (JP) .................................. 2021-127595

(51) Int. Cl.
*A45D 29/00* (2006.01)
*G06T 7/149* (2017.01)
(52) U.S. Cl.
CPC .............. *A45D 29/00* (2013.01); *G06T 7/149* (2017.01); *A45D 2029/005* (2013.01)
(58) Field of Classification Search
CPC ... A45D 29/00; A45D 2029/005; G06T 7/149
See application file for complete search history.

(56) References Cited

U.S. PATENT DOCUMENTS 9,205,672 B1 * 12/2015 Bitoh ....................... B41J 3/546
2012/0113171 A1 * 5/2012 Murata .................. B41J 11/008
396/14
2013/0038648 A1 * 2/2013 Kasahara ................. B41J 3/407
347/2
2015/0375525 A1 * 12/2015 Yamasaki ................ B41J 3/407
347/16
2020/0307252 A1 * 10/2020 Yamasaki .............. B41J 3/4073
2023/0044135 A1 * 2/2023 Sasaki ....................... G06T 7/13

FOREIGN PATENT DOCUMENTS

| JP | 2016-064104 A | | 4/2016 |
| JP | 2018 55364 A | * | 4/2018 |
| JP | 2018-055364 A | | 4/2018 |

OTHER PUBLICATIONS

Cao, Xudong et al., "Face Alignment by Explicit Shape Regression," Microsoft Research Asia; 2012, pp. 2887-2894.
JPO; Application No. 2021-127595; Notice of Reasons for Refusal dated Jun. 20, 2023.

* cited by examiner

*Primary Examiner* — Nicholas D Lucchesi
(74) *Attorney, Agent, or Firm* — Fitch, Even, Tabin & Flannery LLP

(57) ABSTRACT

A contour detection apparatus includes at least one processor. The processor detects a first nail contour defining a nail region from a finger image of a finger including a nail by performing fitting with a nail contour model. Further, the processor obtains a second nail contour input from a user against the first nail contour that the user does not approve. Further, the processor classifies the first nail contour as a group based on dimensional information on dimensions of the first nail contour, and derives difference information indicating a difference between the first nail contour and the second nail contour.

11 Claims, 13 Drawing Sheets

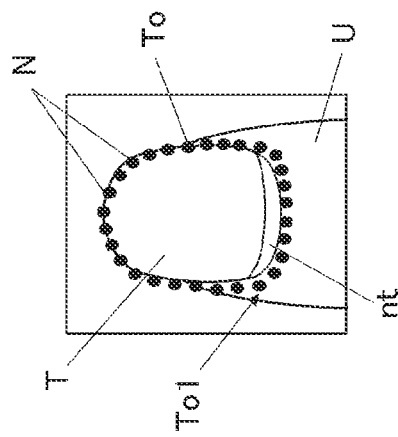
FIG.10A
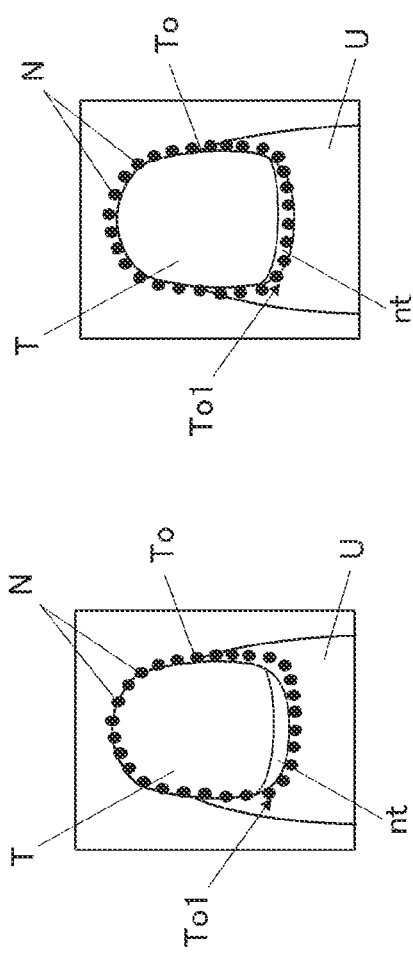
FIG.10B
FIG.10C
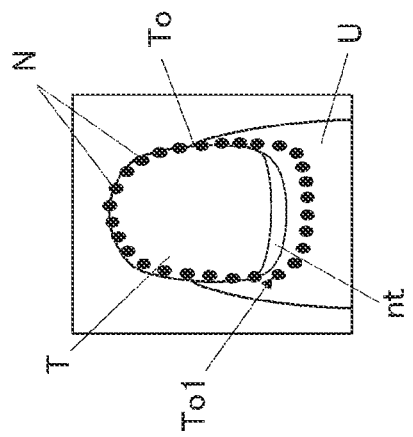
FIG.10D
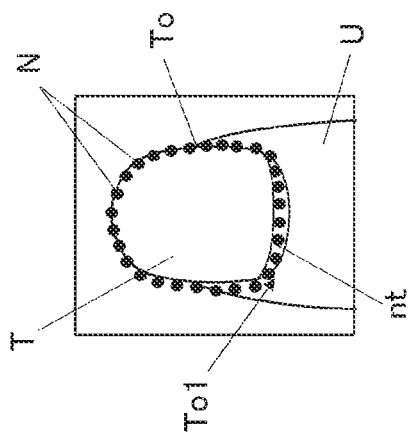
FIG.10E
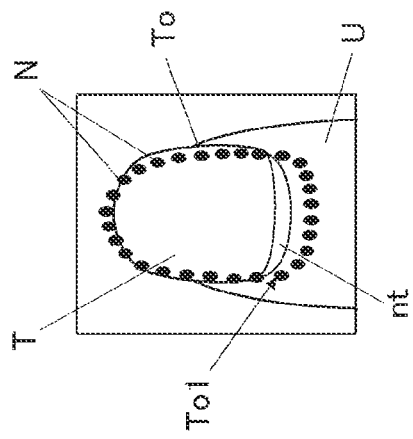
FIG.10F

CONTOUR DETECTION APPARATUS, PRINTING APPARATUS, CONTOUR DETECTION METHOD AND STORAGE MEDIUM

CROSS-REFERENCE TO RELATED APPLICATIONS

This application is based upon and claims the benefit of priority from Japanese Patent Application No. 2021-127595 filed on Aug. 3, 2021, the entire content of which is incorporated herein by reference.

BACKGROUND

Technical Field

The present disclosure relates to a contour detection apparatus, a printing apparatus, a contour detection method and a storage medium.

Description of Related Art

There has been known a method of detecting the contour of a detection target from an image by image processing, the image being obtained by imaging the detection target.

For example, in the case where an image of a person is taken with a camera, the contour of the face of the person and the contours of parts of the face, such as eyes, nose and mouth, can be detected from the image by using a contour detection technique.

The contour detection technique is applicable to detection of not only the contours of a face and parts of the face but also other various contours, such as the contours of nails.

As such a contour detection technique, there is a method of collecting training samples and performing learning with these, generating training data as a learning result, and performing contour detection using the training data.

Examples of the conventional method used for contour detection include AAM (Active Appearance Model) and ASM (Active Shape Model). These methods use a model called "shape model" to represent arrangement of feature points of the contour of a face or a part of the face. This shape model is fitted to an image including the detection target, thereby detecting the contour of the detection target.

Further, there is disclosed in "Face Alignment by Explicit Shape Regression", CVPR 2012: 2887-2894 (hereinafter "Non-Patent Literature 1") a technique for detecting the contour of the detection target by an algorithm called ESR (Explicit Shape Regression).

In ESR too, a shape model (initial shape) with feature points arranged around the centroid is generated, and this shape model is fitted to an image including the detection target. In ESR, as disclosed in Non-Patent Literature 1, weak regressors (weak discriminators) of two levels are used in combination to perform contour detection as a regression problem of gradually converging the shape model (initial shape) to the contour of the detection target, which is the correct position.

SUMMARY

According to an aspect of the present disclosure, there is provided a contour detection apparatus including at least one processor that detects a first nail contour defining a nail region from a finger image of a finger including a nail by performing fitting with a nail contour model, obtains a second nail contour input from a user against the first nail contour that the user does not approve, and classifies the first nail contour as a group based on dimensional information on dimensions of the first nail contour, and derives difference information indicating a difference between the first nail contour and the second nail contour.

BRIEF DESCRIPTION OF DRAWINGS

The accompanying drawings, which are incorporated in and constitute a part of the specification, illustrate embodiments, and together with the general description given above and the detailed description of the embodiments given below, serve to explain the principles of the present disclosure, wherein:

FIG. 10A shows an example of an incorrect first nail contour.

FIG. 10B shows another example of the incorrect first nail contour;

FIG. 10C shows another example of the incorrect first nail contour;

FIG. 10D shows another example of the incorrect first nail contour;

FIG. 10E shows another example of the incorrect first nail contour;

FIG. 10F shows another example of the incorrect first nail contour;

DETAILED DESCRIPTION

First Embodiment

With reference to FIG. 1 through FIG. 14, a first embodiment of a contour detection apparatus, a contour detection method and a storage medium according to the present disclosure will be described.

Hereinafter, as an example, a fingernail(s) is treated as a detection target, the contour of which is detected.

Although various limitations technically preferable for carrying out the present disclosure are put on embodiments described below, the scope of the present disclosure is not limited to the embodiments below or illustrated examples.

Figure 1:
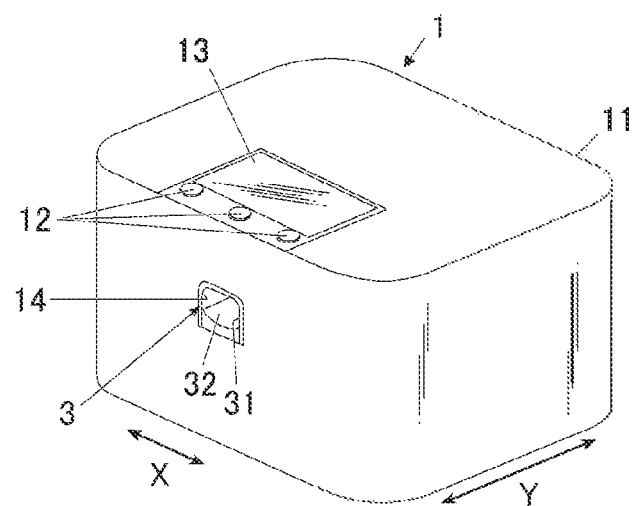
FIG. 1 is a perspective view of a contour detection apparatus according to an embodiment(s), showing its external appearance.

FIG. 1 is a perspective view of a contour detection apparatus of this embodiment, showing its external appearance.

As shown in FIG. 1, a contour detection apparatus 1 of this embodiment includes a substantially box-shaped case 11.

On the upper surface (top panel) or the like of the case 11, an input unit 12 is set.

The input unit 12 is a functional unit that allows a user to make various inputs.

The input unit 12 includes operation buttons for various inputs, such as a power switch button to turn on a power source of the contour detection apparatus 1, a stop switch button to stop operation, and a detection start button to make an instruction to start to detect the contour of a nail T.

In this embodiment, as described below, a touchscreen 121 is integrated with the surface of a display 13. The touchscreen 121 also functions as the input unit 12.

For example, a nail contour that the contour detection apparatus 1 automatically detects from a finger image FI (a detected nail contour, which is hereinafter referred to as "first nail contour To1") is displayed on the display 13. The finger image FI (shown in FIG. 5A, FIG. 5C, etc.) is obtained by imaging a finger U. The user can check the first nail contour To1 on the screen, and determine whether the first nail contour To1 indicates a proper nail contour To.

If the first nail contour To1 indicate an incorrect line (i.e., the first nail contour To1 does not indicate a proper contour), the user can input a second nail contour To2 by tracing, on the touchscreen 121, a correct contour of the nail T (line as a contour line inside of which the user wants the contour detection apparatus 1 to recognize as the nail T, i.e., a correct nail contour, which is hereafter referred to as "second nail contour To2"). The second nail contour To2 may not be input by using the touchscreen 121, but may be input by using another not-shown pointing device, such as a mouse or a trackball.

Thus, in this embodiment, the input unit 12 including the touchscreen 121 is an input receiver that receives an input of the second nail contour To2 from the user.

On the upper surface (top panel) of the case 11, the display 13 is set.

The display 13 is a display configured, for example, by a liquid crystal display (LCD), an organic electroluminescent display or another flat display.

In this embodiment, the display 13 displays, as appropriate, various instructions, a nail image (finger image including an image of the nail T) obtained by imaging the finger U, an image of the contour (contour line) or the like of the nail T included in the nail image, an instruction screen(s) displaying the various instructions, and so forth.

As described above, the touchscreen 121, which functions as the input unit 12, is integrated with the surface of the display 13.

In the front surface of the case 11 (near side in FIG. 1), an opening 14 is formed. At the time of imaging by the contour detection apparatus 1, the finger U corresponding to the nail T, which is the detection target, is inserted into the opening 14 to be set at a position that an imager 5 can image.

In the opening 14, a finger chamber 3 that fixes the nail T (finger U including the nail T), which is the detection target in this embodiment, is arranged.

Figure 2A:
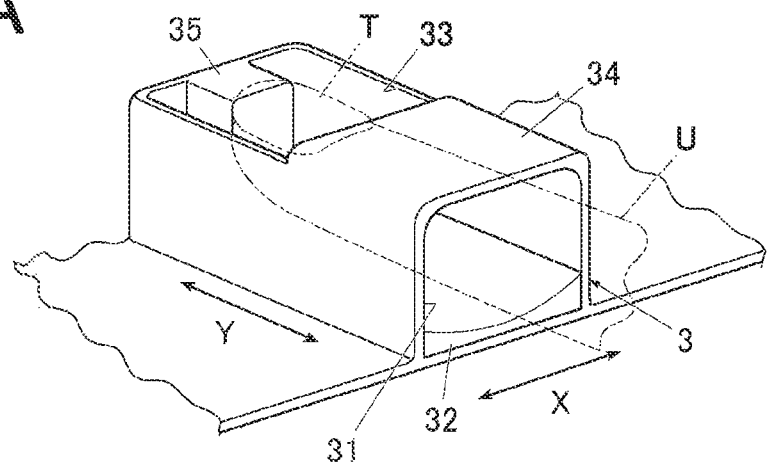
FIG. 2A is a perspective view of a finger chamber.
Figure 2B:
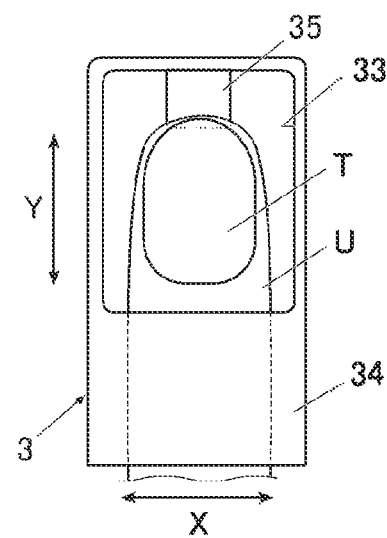
FIG. 2B is a plan view of the finger chamber viewed from above.

FIG. 2A is a perspective view of the finger chamber 3, and FIG. 2B is a plan view of the finger chamber 3 viewed from above.

In FIG. 2A, the finger U including the nail T placed in the finger chamber 3 is indicated by a two-dot chain line.

As shown in FIG. 2A, etc., the finger chamber 3 is a box-shaped member provided with an opening 31 at the near side of the contour detection apparatus 1. In the finger chamber 3, a finger support 32 that supports the finger U is arranged. The finger chamber 3 is arranged in the case 11 such that the opening 31 corresponds to the opening 14 of the case 11.

The finger support 32 pushes up and supports the finger U from underneath, and is formed of, for example, a flexible resin. The finger support 32 is not particularly limited in configuration as far as it can support the finger U from underneath. For example, the finger support 32 may be configured to be biased from underneath by an elastic member, such as a spring. Alternatively, for example, the finger support 32 may be configured to be inflatable by changing internal pressure thereof to push up the finger U in the inflated state and fix the finger U at that position.

The deep side of the top surface of the finger chamber 3 is configured as a window 33 that is opened. The window 33 exposes the nail T of the finger U inserted in the finger chamber 3.

The near side of the top surface of the finger chamber 3 is configured as a finger press 34 that prevents the finger U from floating up and defines the position of the finger U in the upward direction. The finger U with the nail T is supported by the finger support 32 from underneath and pressed by the finger press 34 from above, so that their position in the height direction is determined to be a certain position.

In this embodiment, at the deep side in the finger inserting direction, a nail rest 35 where the nail T is placed is arranged. The nail rest 35 is a positioning unit that positions the nail T, which is the detection target.

Placing the tip of the nail T on the nail rest 35 defines the position of the nail T in the horizontal direction (i.e., X direction and Y direction), and also defines the position thereof in the height direction.

Figure 3:
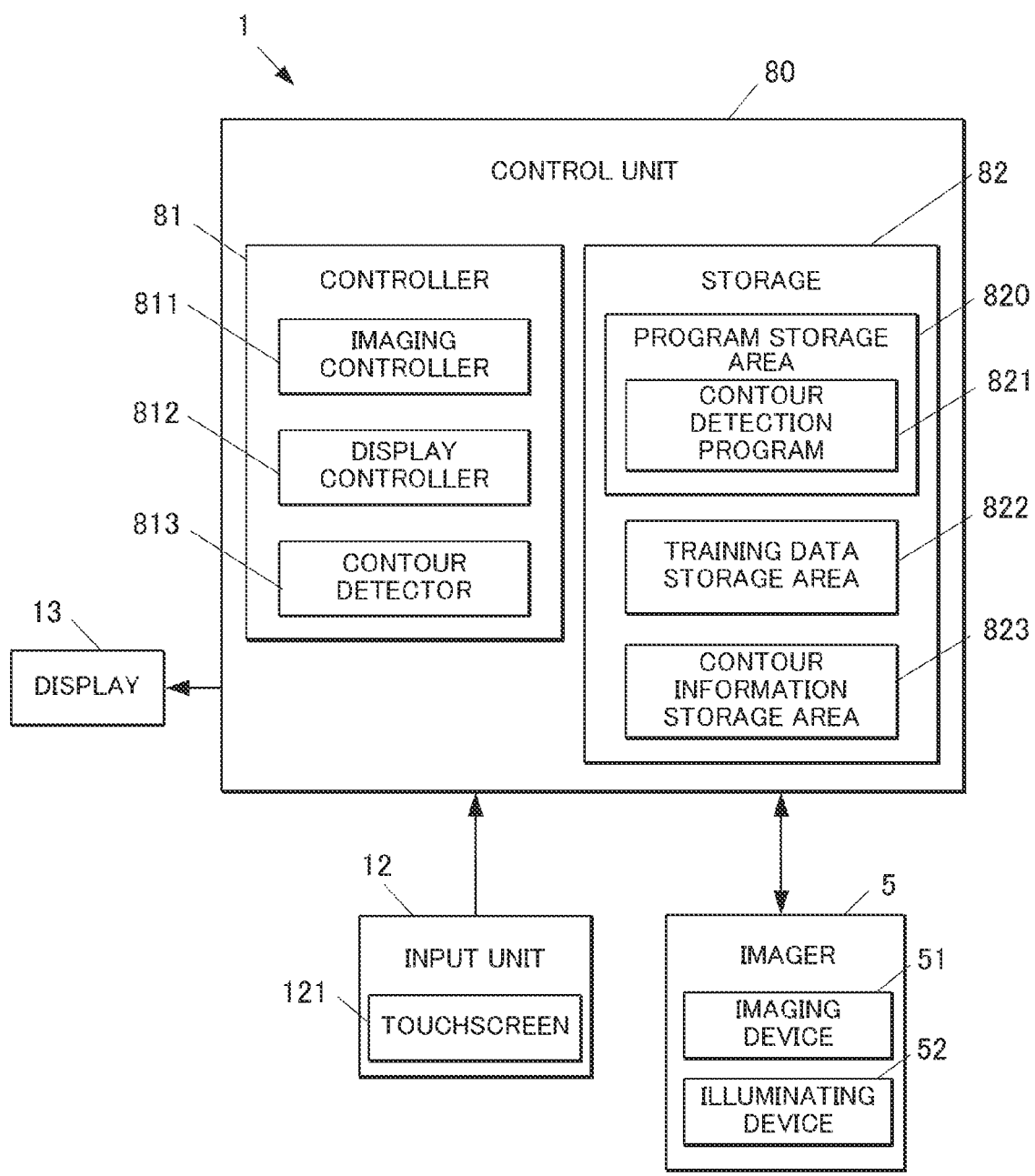
FIG. 3 is a block diagram of the main part of the contour detection apparatus according to the embodiment, showing an example of its functional configuration.

FIG. 3 is a block diagram of the main part of the contour detection apparatus of this embodiment, showing an example of its functional configuration.

As shown in FIG. 3, the contour detection apparatus 1 includes the imager 5.

The imager 5 includes an imaging device 51 and an illuminating device 52, and is arranged above the position where the nail T is placed when the finger U is inserted in the finger chamber 3.

The imaging device 51 is, for example, a small-sized camera including a solid state image sensor having two million pixels or more and a lens.

The illuminating devices 52 is, for example, an illuminating lamp, such as a white LED. In this embodiment, a plurality of illuminating devices 52 is arranged so as to surround the imaging device 51.

The positions of the imaging device 51 and the illuminating devices 52 are not limited to those described above. The imaging device 51 and the illuminating devices 52 of the imager 5 may be fixedly arranged above the nail T, or may be movable to above the nail T with the imager 5 configured to be movable with a moving system.

In this embodiment, the imager 5 is a finger image obtaining unit that obtains the finger image FI. The imager 5 obtains the finger image FI by imaging the finger U including the nail T, which is the detection target, in the state in which the finger U is placed in the finger chamber 3.

More specifically, the imaging device 51 is configured to image an area corresponding to the window 33 of the finger chamber 3, so that the finger U and the nail T exposed through the window 33 can be in the angle of view. Since the finger U is positioned by the finger chamber 3, and the area corresponding to the window 33 is imaged by the imaging device 51, the positional relationship between the finger U including the nail T and the finger image FI, in which the finger U including the nail T is captured, is always substantially the same (e.g., the tip to the first joint of the finger U is in the angle of view).

The contour detection apparatus 1 of this embodiment further includes a control unit 80.

The control unit 80 is set on a not-shown substrate or the like arranged on the lower side of the top surface of the case 11, for example.

The control unit 80 is a computer that includes: a controller 81 including a not-shown CPU (Central Processing Unit) that functions as a processor; and a storage 82 including a not-shown ROM (Read Only Memory) and a not-shown RAM (Random Access Memory).

The storage 82 includes a program storage area 820 where, for example, various programs executable by the processor to cause the contour detection apparatus 1 to operate, such as a contour detection program 821, are stored.

In this embodiment, the storage 82 also includes a training data storage area 822 where training data for contour detection is stored, the training data being used by a contour detector 813 to detect nail contours from images, and a contour information storage area 823 where detection results of the detection by the contour detector 813 are stored.

The training data storage area 822 is a training data storage storing data of an initial shape(s) To0 that is a learning result(s) generated on the basis of training images, constituted of a plurality of feature points N, and used for detecting the nail contour To (shown in FIG. 4, which may be hereinafter referred to as "nail contour model").

In the training data storage area 822, the training data obtained by prior learning is stored. Examples thereof include: coordinates (Xn0, Yn0; Xn1, Yn1; . . . ; and Xnn, Ynn) of feature points N0 to Nn constituting the initial shape To0 (nail contour model); the position of the centroid (not shown) of the initial shape To0; and a regressor(s) (discriminator(s)) made up of a displacement function (regression function).

The training data is obtained by feature extraction to extract, from training images, a feature amount useful for contour detection. Examples of the feature amount include: the brightness value or color of each pixel; and the amount of change in the brightness value or color between every adjacent pixels. When the feature amount is extracted, data of X, Y coordinates of feature points representing the shape of the nail region is generated for and associated with each training image.

Then, by using the data of X, Y coordinates of the feature points associated with each training image, pattern learning is performed to generate the training data as the learning result that includes: the initial shape To0 that is a like shape of the nail T as the detection target (coordinates of the feature points N constituting the contour of the initial shape To0); the centroid of the initial shape To0; and the discriminator(s). This learning is usually performed by machine learning.

The training data, such as the initial shape To0, stored in the training data storage area 822 is generated in advance by repeatedly learning contour detection, and stored in the storage 82 (training data storage area 822 in the storage 82) of the contour detection apparatus 1 that is in the initial state before shipment.

As described below, in this embodiment, the contour detector 813 detects the contour or the like of the nail T, which is the detection target, on the basis of the training data as the learning result.

The controller 81, as viewed functionally, includes an imaging controller 811, a display controller 812 and the aforementioned contour detector 813. Functions as the imaging controller 811, the display controller 812, the contour detector 813 and so forth are carried out by the CPU of the controller 81 and a program(s) stored in the ROM of the storage 82 working together.

The imaging controller 811 controls the imaging device 51 and the illuminating devices 52 of the imager 5 to cause the imaging device 51 to image the finger U placed in the finger chamber 3, thereby obtaining an image (finger image FI) of the finger U including an image of the nail T.

The display controller 812 controls and thereby causes the display 13 to display, on the display screen, various types of information. In this embodiment, as described above, the display controller 812 causes the display 13 to display, on the display screen, the finger image FI, an image of, for example, the finger contour Uo and the nail contour To superimposed on the finger image FI, a screen asking the user whether he/she approves the first nail contour To1, and so forth.

The contour detector 813 is a contour detector that performs fitting with the initial shape To0, thereby detecting the nail contour To defining the region of the nail T from the finger image FI.

In this embodiment, the contour detector 813 also detects the finger contour Uo defining the region of the finger U from the finger image FI. In order to detect the finger contour Uo, for example, a background difference method may be used. That is, for example, the imager 5 images, in advance, the window 33 of the finger chamber 3 with no finger U set, the window 33 entirely being in the angle of view, thereby generating and obtaining a pre-state image. Then, when the imager 5 images the finger U, thereby obtaining the finger image FI, the contour detector 813 compares the finger image FI with the pre-state image to detect an object not in the pre-state image as the finger U.

The contour detector 813 detects (coordinates of feature points constituting) the contour of the nail T on the basis of the image of the nail T (finger image FI) obtained by the imaging device 51 imaging the finger U.

In this embodiment, the contour detector 813 uses ESR (Explicit Shape Regression) to detect the contour of the nail T.

That is, the contour detector 813 fits the initial shape To0 (nail contour model) stored in the training data storage area 822 of the storage 82 to an image including the detection target.

In contour detection using ESR, as disclosed in the aforementioned Non-Patent Literature 1, weak regressors (weak discriminators) of two levels are used in combination to treat contour detection as a regression problem of gradually converging the initial shape To0 (nail contour model) to the contour of the detection target as a correct position.

Figure 4:
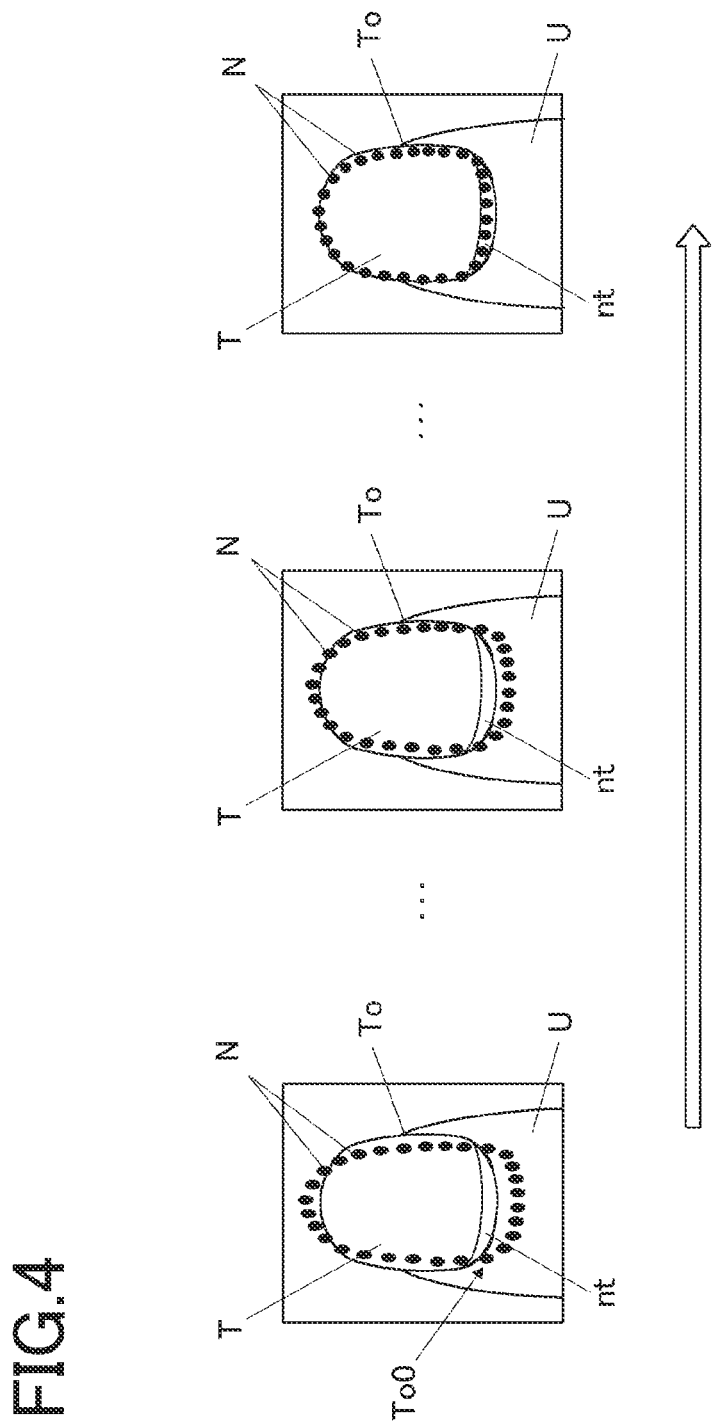
FIG. 4 schematically shows a normal nail contour detection process.

FIG. 4 schematically shows a detection process of the nail contour To by ESR algorithm (i.e., a process of deforming the initial shape To0 (nail contour model) on the basis of training data to bring it close to the nail contour To).

Figure 8:
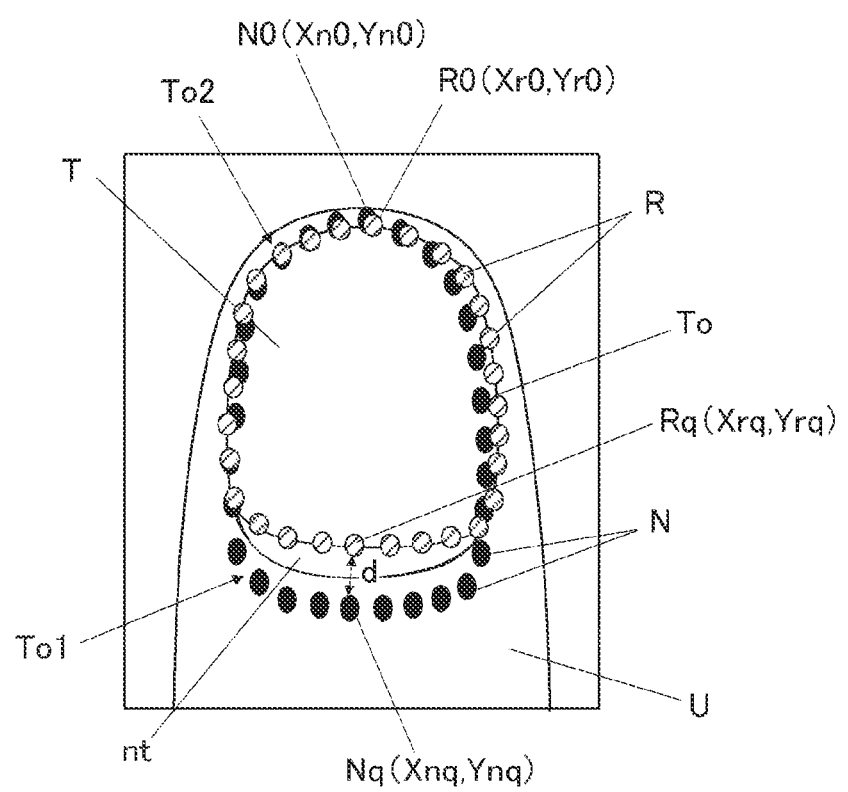
FIG. 8 is an illustration showing a first nail contour and a second nail contour.

Usually, in detection of the nail contour To by ESR algorithm, the feature points N of the initial shape To0 (nail contour model) are gradually moved, namely, a detection loop is executed many times, thereby gradually being close to the second nail contour To2 (shown in FIG. 8).

More specifically, when the finger image FI including the nail region is input, the contour detector 813 places the initial shape To0 at a proper position (initial position) in the finger image F, as shown at the left side in FIG. 4. In FIG. 4, etc., the cuticle between the nail T and the skin of the finger U is represented by a cuticle region nt. The cuticle region nt is a region the boundary of which is unclear and irregular and is a part that is likely to cause an error in detection of the nail contour To.

The method treating contour detection as a regression problem, such as ESR, is robuster than the contour detection method of performing fitting with a shape model, such as AAM, and hence even if what is used as the initial shape To0 and the initial position where the initial shape To0 is placed are not set so strictly, they little affect the precision of the detection result.

The initial shape To0 therefore can be used and shared by different finger images FI being input.

However, even when ESR or the like is used, it is better to place the initial shape To0 so as to coincide with the nail region as much as possible as it contributes to higher-precision contour detection.

Hence, in this embodiment, it is preferable that the initial shape To0 be placed such that the centroid of the initial shape To0 is positioned at the mean centroid, which is the average value of the centroid(s) in the training data.

When the initial shape To0 is placed, the contour detector 813 repeats displacement of the initial shape To0 by the regressor (weak regressors of two levels in the case of ESR) made up of the displacement function (regression function), which is generated by prior learning and stored in advance in the contour information storage area 823 of the storage 82, thereby gradually converging the initial shape To0 to the contour of the nail T (nail contour To, i.e., a correct boundary of the nail region) as the correct position, as shown in FIG. 4 from the left side to the right side.

Next, with reference to FIG. 5 through FIG. 14, the contour detection method by the contour detection apparatus 1 of this embodiment will be described.

Figure 5A:
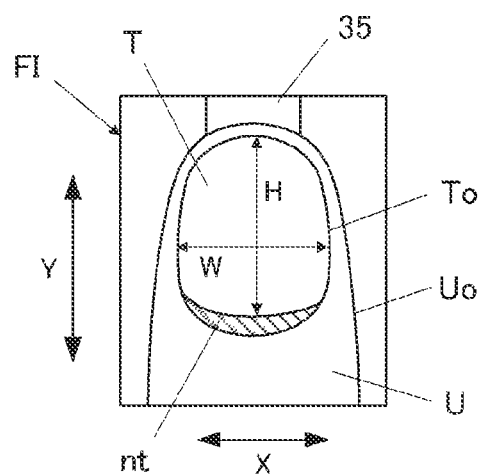
FIG. 5A shows an example of a finger image.
Figure 6:
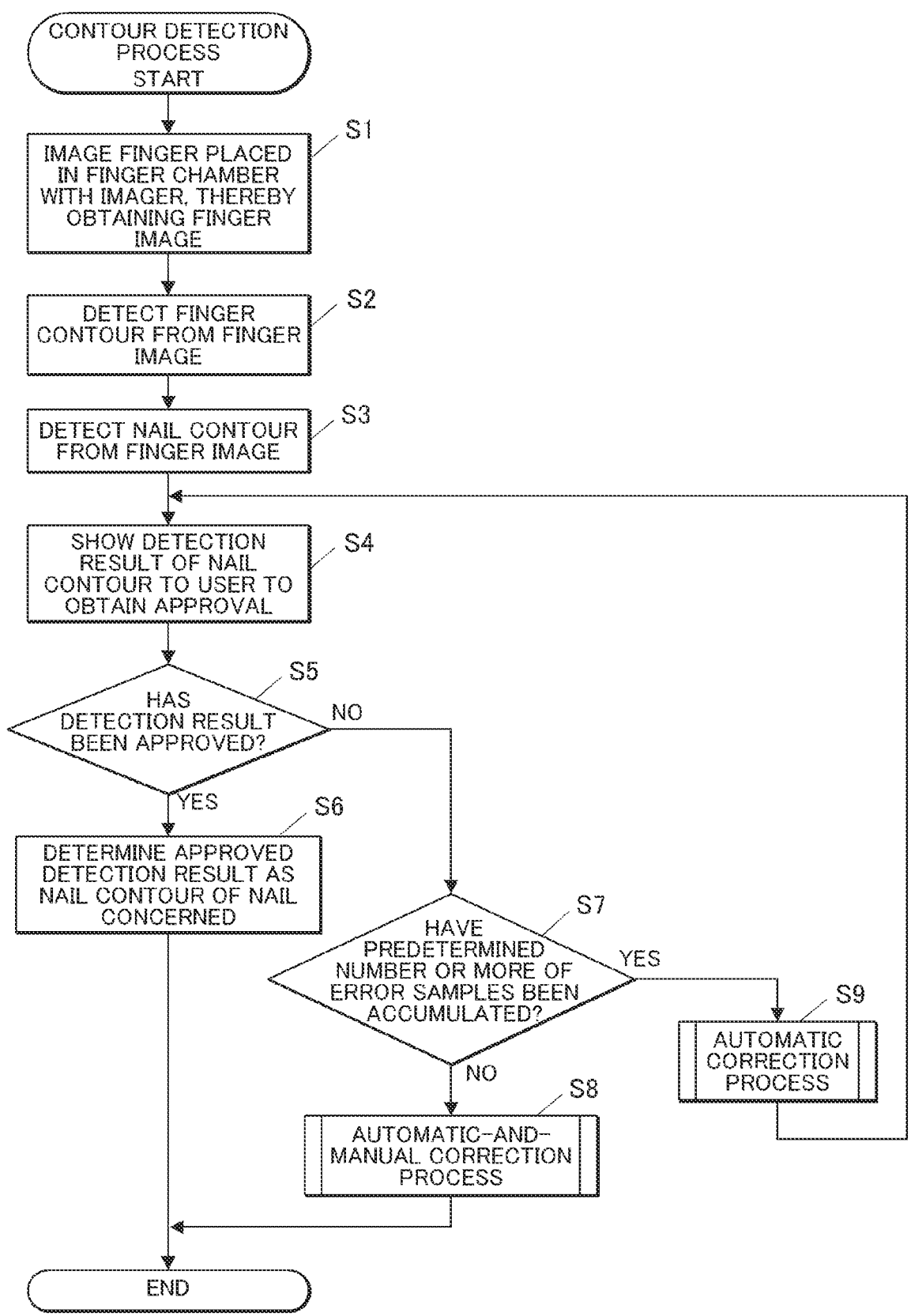
FIG. 6 is a flowchart of a contour detection process according to the embodiment.

As shown in FIG. 6, in order to detect the contour of the nail T, first, the imager 5 images the finger U placed in the finger chamber 3, thereby obtaining the finger image FI (Step S1). FIG. 5A shows an example of the finger image FI. As shown in FIG. 5A, the finger image FI is an image obtained by imaging part of the finger U corresponding to the window 33 of the finger chamber 3 shown in FIG. 2B.

The controller 81 as the contour detector 813 reads the pre-state image, which is an image obtained in advance of no finger U placed in the finger chamber 3, from the storage 82, detects an object not in the pre-state image as the finger U by the background difference method of comparing the finger image FI with the pre-state image, and detects the finger contour Uo defining the region of the finger U (which may be hereinafter referred to as "finger region") detected from the finger image FI (Step S2). The left side in FIG. 5B shows an example of the finger region detected from the finger image FI shown in FIG. 5A.

The controller 81 as the contour detector 813 detects the nail contour To (which is referred to as "first nail contour To1") from the finger image FI (Step S3).

Detection of the nail contour To in Step S3 is to detect a portion likely to be the nail contour To by ESR algorithm of applying the initial shape To0, which is the training data stored in the training data storage area 822, to the finger image FI.

Figure 5B:
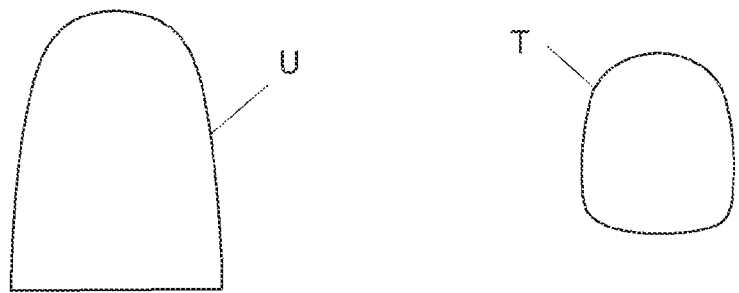
FIG. 5B shows an example of a finger region and a nail region detected from the finger image shown in FIG. 5A.

The right side in FIG. 5B shows an example of the nail T the nail contour To of which is correctly detected from the finger image FI shown in FIG. 5A.

As shown by shading in FIG. 5A, under the region of the nail T (which may hereafter be referred to as "nail region") (lower side in FIG. 5A, base side of the nail T), the cuticle region nt is present. As shown in FIG. 5B, the nail region means an area of the nail T not including the cuticle region nt.

Figure 5C:
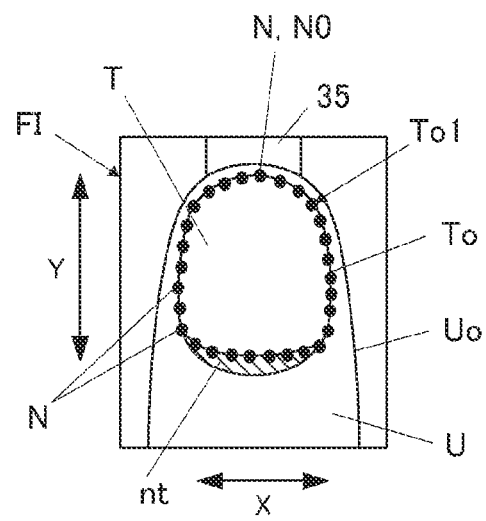
FIG. 5C shows a display example of a first nail contour superimposed on the finger image shown in FIG. 5A.

As shown in FIG. 5C, etc., the first nail contour To1 is constituted of an aggregate of the feature points N (N0 to Nn).

For example, a point located closest to the tip of the nail T is a feature point N0 (coordinates; Xn0, Yn0), and from this point counterclockwise, points are a feature point N1 (coordinates; Xn1, Yn1), a feature point N2 (coordinates; Xn2, Yn2), . . . and a feature point Nn (coordinates; Xnn, Ynn). The number of the feature points N constituting the first nail contour To1 is not particularly limited.

When the controller 81 as the contour detector 813 detects the first nail contour To1, the controller 81 shows the first nail contour To1 as the detection result to the user to obtain approval (Step S4). How to show the detection result to the user is not particularly limited. For example, as shown in FIG. 5C, the first nail contour To1 may be displayed by being superimposed on the finger image FI. In Step S4, it is preferable to display a message on the display screen of the display 13 asking the user whether he/she approves the first nail contour To1, which is the detection result. How to ask the user for approval is not limited thereto. For example, it may be a voice message or the like.

The controller 81 as the contour detector 813 determines whether the user has approved the detection result, namely, whether the controller 81 has received/obtained an input (e.g., a press on an OK button) from the input unit 12 or the like indicating approval of the first nail contour To1, which is the detection result (Step S5).

If the controller 81 as the contour detector 813 determines that the user has approved the first nail contour To1 (Step S5; YES), the controller 81 determines the approved detection result (first nail contour To1) as the nail contour To of the nail T concerned (Step S6), and ends the contour detection process.

On the other hand, if the controller 81 as the contour detector 813 determines that the user had not approved the first nail contour To1 (Step S5; NO), the controller 81 determines whether a predetermined number or more of error samples have been accumulated (Step S7). The error samples, which will be described below in detail, are generated on the basis of incorrect first nail contours To1 (i.e., first nail contours To1 not approved by the user) and second nail contours To2. If the controller 81 as the contour detector 813 determines that the predetermined number or more of error samples have not been accumulated yet (Step S7; NO), the controller 81 performs an automatic-and-manual correction process that is combination of a process of automatically correcting the first nail contour To1 and a process of getting the user to (manually) correct the first nail contour To1 (Step S8).

Hereinafter, the automatic-and-manual correction process (Step S8 in FIG. 6) will be described with reference to FIG. 7 through FIG. 11.

Figure 7:
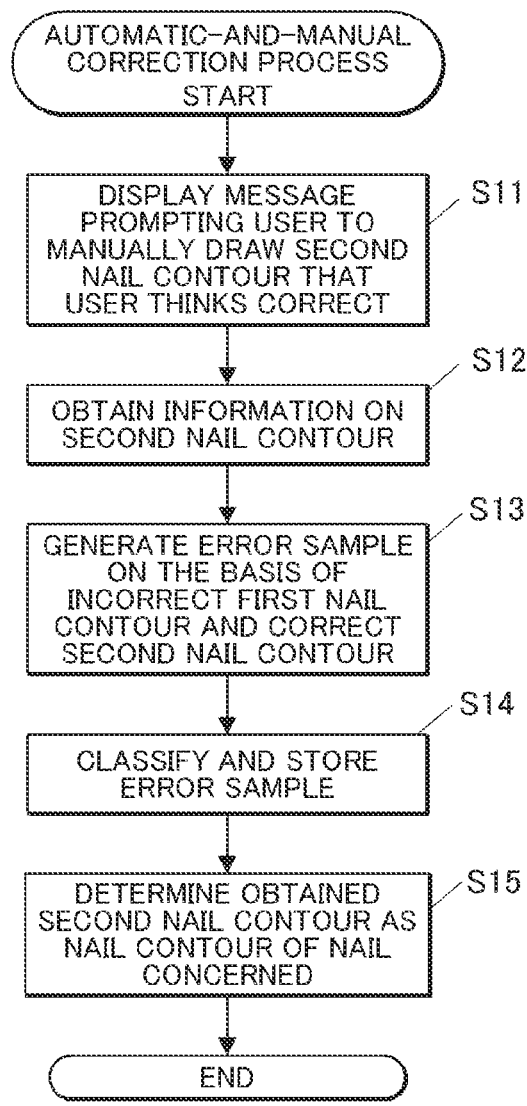
FIG. 7 is a flowchart of an automatic-and-manual correction process according to the embodiment.

In the automatic-and-manual correction process, as shown in FIG. 7, first, the controller 81 causes the display 13 or the like to display a message prompting the user to manually draw a nail contour that he/she thinks correct (which is referred to as "second nail contour To2") (Step S11).

The user who has received this message inputs the second nail contour To2 on the touchscreen 121 or the like. More specifically, the user draws a line at a position that he/she thinks correct with a pen for input or a fingertip.

When the user inputs the second nail contour To2, the controller 81 as the contour detector 813 obtains information on the second nail contour To2 (Step S12).

FIG. 8 shows an example of the second nail contour To2 input by the user. Even if the user inputs the second nail contour To2 in the form of a line, the controller 81 as the contour detector 813 that has received the second nail contour To2 grasps it as an aggregate of feature points R constituting the line, as shown in FIG. 8.

As to the feature points R of the second nail contour To2 too, for example, a point located closest to the tip of the nail T is a feature point R0 (coordinates; Xr0, Yr0), and from this point counterclockwise, points are a feature point R1 (coordinates; Xr1, Yr1), a feature point R2 (coordinates; Xr2, Yr2), . . . and a feature point Rn (coordinates; Xrn, Yrn). The number of the feature points R constituting the second nail contour To2 is, as with the number of the feature points N constituting the first nail contour To1, not particularly limited.

In FIG. 8, the feature points N, which constitute the first nail contour To1, are represented by black dots, and the feature point R, which constitute the second nail contour To2, are represented by obliquely shaded dots. For convenience of explanation, the feature points N, R are shown as dots of a larger size than they actually are.

When the controller 81 as the contour detector 813 obtains the information on the second nail contour To2, the controller 81 generates an error sample on the basis of the incorrect first nail contour To1 (i.e., first nail contour To1 not approved by the user) and the second nail contour To2 (Step S13), and classifies the error sample as a proper group (Step S14).

Then, the controller 81 as the contour detector 813 determines the obtained second nail contour To2 (nail contour input by the user) as the nail contour To of the nail T concerned (Step S15), and ends the contour detection process.

Next, with reference to FIG. 9, generation of the error sample (Step S13 in FIG. 7) and classification of the error sample (Step S14 in FIG. 7), namely, a sample generation-and-classification process, will be described in detail.

First, the contour detector 813 (controller 81) calculates the ratio of the area of the nail region (region defined by the first nail contour To1) in the incorrect detection result to the area of the finger region (region defined by the finger contour Uo detected in Step S2 in FIG. 6) (Step S21). That is, the contour detector 813 obtains the area ratio of the region of the nail T to the region of the finger U shown in FIG. 5B. The area ratio of the region of the nail T to the region of the finger U is dimensional information on dimensions of the region defined by the first nail contour To1.

The contour detector 813 also calculates the aspect ratio as the dimensional information on dimensions of the nail region (region defined by the first nail contour To1) in the incorrect detection result (Step S22). That is, the contour detector 813 calculates the ratio of the dimension W in the horizontal direction to the dimension H in the vertical direction of the nail region, which is the region inside the nail contour To, shown in FIG. 5A.

The contour detector 813 compares the incorrect nail contour (first nail contour To1 as the detection result) with the correct nail contour (second nail contour To2 input by the user), thereby obtaining difference information indicating the degree of difference (error) between these two (i.e., correction width to make the incorrect first nail contour To1 the second nail contour To2) (Step S23).

The difference information includes: information indicating the maximum error feature point that is, among the feature points N constituting the first nail contour To1 that correspond to the feature points constituting the second nail contour To2, a feature point N having the largest difference (error) from the second nail contour To2; and information indicating the magnitude of the (largest) difference (error).

For example, in the case shown in FIG. 8, among the feature points N constituting the first nail contour To1 that correspond to the feature points R constituting the second nail contour To2, a feature point Nq (coordinates; Xnq, Ynq) of the first nail contour To1 near the base of the nail T corresponding to a feature point Rq (coordinates; Xrq, Yrq) of the second nail contour To2 is farthest away from the second nail contour To2, and hence is the maximum error feature point. The magnitude of the difference (error) of Nq (coordinates; Xnq, Ynq) and Rq (coordinates; Xrq, Yrq) (correction width, i.e., degree of separation of the points) is "distance d".

Which feature point is treated as the maximum error feature point may be set automatically by the controller 81 as the contour detector 813, or may be set by the user specifying an area where the user thinks that the first nail contour To1 and the second nail contour To2 are farthest from one another by operating the touchscreen 121 or the like.

The difference information is not limited to the magnitude of the difference (error), but may be or include information on their deviating direction (vector).

Figure 9:
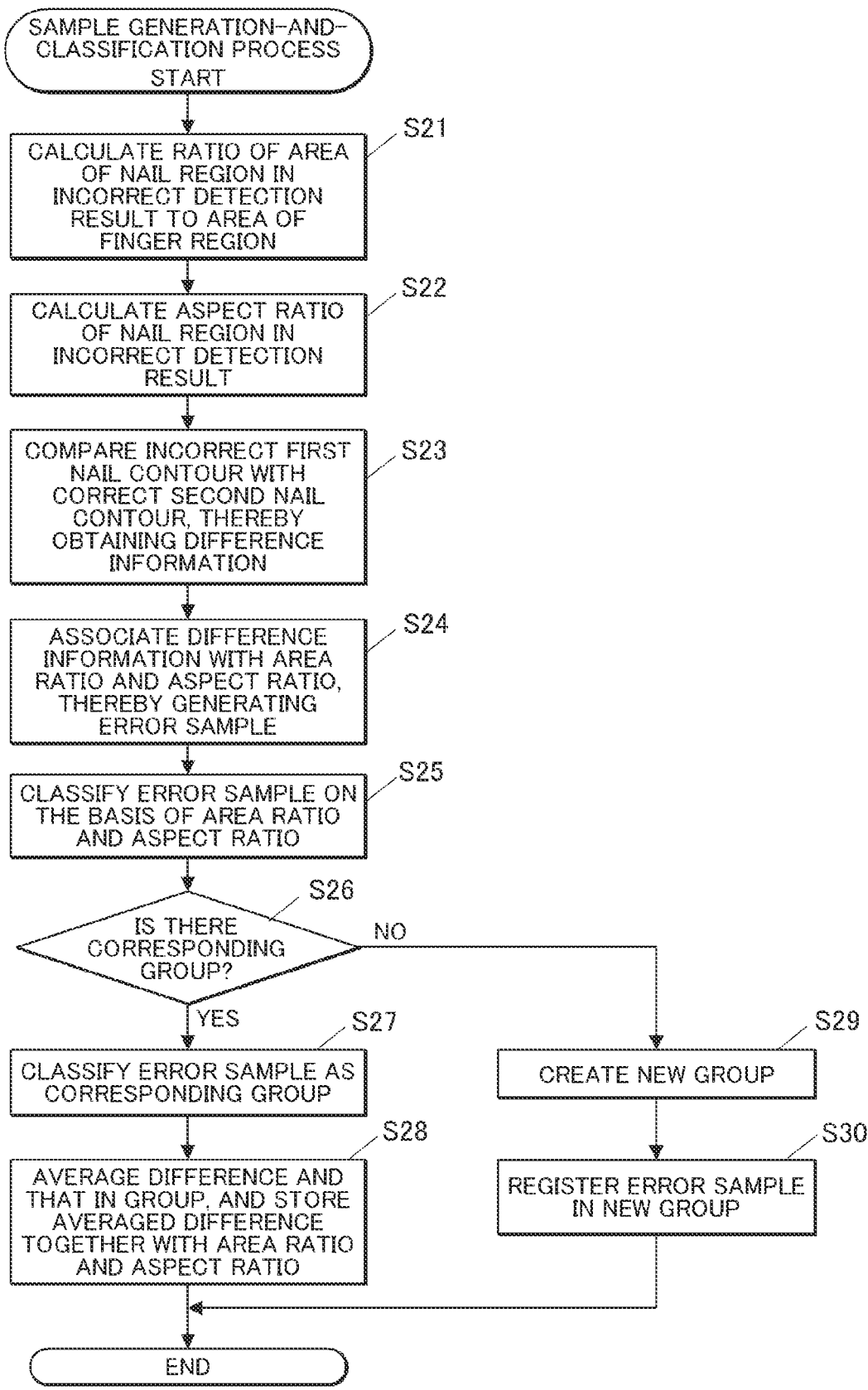
FIG. 9 is a flowchart of a sample generation-and-classification process according to the embodiment.

The order of Step S21 to obtain the area ratio, Step S22 to obtain the aspect ratio and Step S23 to obtain the difference information is not limited to the order shown in FIG. 9. The order may be reversed. For example, the aspect ratio may be obtained before the area ratio is obtained.

The process of obtaining the area ratio of the nail region to the finger region (Step S21) is not essential. Only the aspect ratio of the nail region and the difference information may be referenced to generate and classify an error sample.

In this embodiment, the contour detector 813 associates the area ratio, the aspect ratio and the difference information with one another, thereby generating an error sample (Step S24). Associating the area ratio, the aspect ratio and the difference information with one another can generate a sample indicating what kind of error tends to occur in the detection result of the nail T of what size and shape.

In this embodiment, the contour detector 813 associates and stores, as the difference information, the information indicating the maximum error feature point and the information indicating the magnitude of the error with the area ratio and the aspect ratio. This makes it easier, for example, to compare the first nail contour(s) To1 and the second nail contour(s) To2 in the contour detection process that is performed next time and/or thereafter, and also can reduce the data amount stored in the storage 82. The difference information is not limited to the information on the maximum error feature point, but may be or include information on the line indicating the contour (contour line) of the nail T input by the user as the second nail contour To2 and/or coordinates of some or all of the feature points R constituting the second nail contour To2.

The contour detector 813 tries to classify the error sample on the basis of the area ratio and the aspect ratio (Step S25).

Figure 11:
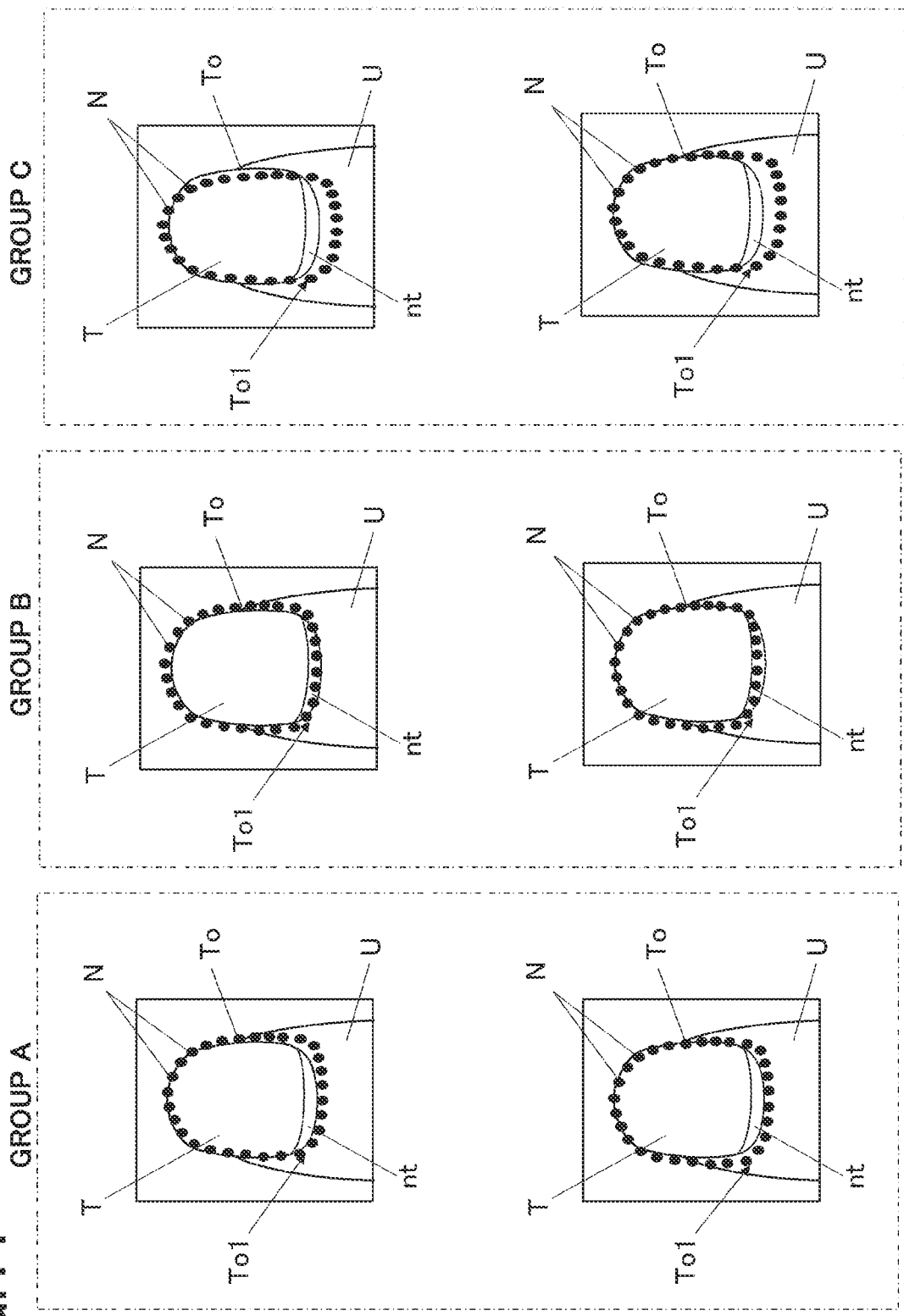
FIG. 11 shows an example of a result of classification of the incorrect first nail contours shown in FIG. 10A through FIG. 10F.

FIG. 10A through FIG. 10F show examples of samples of detected nail contours collected as error samples. FIG. 11 shows an example of classification of the samples shown in FIG. 10A through FIG. 10F into three groups.

As a result of classification of the error samples based on their area ratios and aspect ratios, as shown in FIG. 11, the samples shown in FIG. 10A and FIG. 10C in which a part of the contour line as the first nail contour To1 is located near the boundary between the cuticle region nt of the nail T and the skin of the finger U are classified as group A, the samples shown in FIG. 10B and FIG. 10E in which a part of the contour line as the first nail contour To1 is located in the cuticle region nt of the nail T are classified as group B, and the samples shown in FIG. 10D and FIG. 10F in which a part of the contour line as the first nail contour To1 is located below the cuticle region nt of the nail T due to winkles or the like on the skin of the finger U are classified as group C.

Although the area ratio and the aspect ratio do not directly affect the position of the contour line, error samples having similar area ratios and aspect ratios are often similar in geometric properties (shapes) of fingers U and nails N. Consequently, as shown in FIG. 11, error samples that are similar in incorrectness are classified as the same group. In the classification, not only the area ratio and the aspect ratio but also the difference information may be taken into account. For example, the magnitude of the error (difference), the deviation (vector information on the deviating direction) and/or the like taken into account can make the classification more detailed.

It is preferable that classification of an error sample as a group be performed by finger type.

Even about the same user, the shape or the like of a finger greatly differs from finger to finger, for example, differs between a thumb and a little finger. Classification of an error sample as a group by finger type enables higher-precision detection of the nail contour To.

The contour detector 813 determines whether the error sample, which is generated in Step S24, can be classified as one of existing groups, namely, determines whether there is a corresponding group having a trend similar to that of the error sample (Step S26).

If the contour detector 813 determines that there is a corresponding group (Step S26; YES), the contour detector 813 classifies the error sample as the group (Step S27), and averages the error (difference) and that in the group and stores the averaged error (i.e., average error in the group at this point of time) together with the area ratio and the aspect ratio in the storage 82 (Step S28). For example, the contour detector 813 performs averaging on each of the pair of the maximum error feature points of the first nail contour To1 and the second nail contour To2 within the group, and if the error (difference or correction width) between the averaged maximum error feature point of the first nail contour To1 and the averaged maximum error feature point C of the second nail contour To2 is the average error ad (shown in FIG. 13 and FIG. 14), associates and stores, as averaged difference information, coordinates (Xc, Xc) of the maximum error feature point C and a value of the average error ad with the area ratio and the aspect ratio.

On the other hand, if the contour detector 813 determines that there is no corresponding group (Step S26; NO), the contour detector 813 creates a new group (Step S29), and classifies the error sample as the new group (Step S30).

Returning to FIG. 4, if the contour detector 813 determines that the predetermined number or more of error samples have been accumulated (Step S7; YES), that is, determines that as a result of execution of the contour detection process many time, namely, as a result of repetition of the sample generation-and-classification process, the predetermined number or more of error samples classified have been accumulated, the contour detector 813 performs an automatic correction process of automatically correcting the first nail contour To1 (Step S9).

Before determining whether a predetermined number or more of error samples have been accumulated, the contour detector 813 may calculate, for example, the area ratio and the aspect ratio of the nail T, which is the current detection target the nail contour To of which is detected, determine to which group the nail T belongs, and then determine which correction process to perform, the automatic-and-manual correction process (Step S8) or the automatic correction process (Step S9), by determining whether a predetermined number or more of error samples have been accumulated for the group. This is because even if a sufficient number of error samples have been accumulated as a whole, a sufficient number of error samples for a certain group may have not been accumulated yet. In such a case, the automatic-and-manual correction process (Step S8 in FIG. 6) may make the detection precision higher.

Hereinafter, the automatic correction process (Step S9 in FIG. 6) will be described in detail with reference to FIG. 12 through FIG. 14.

Figure 12:
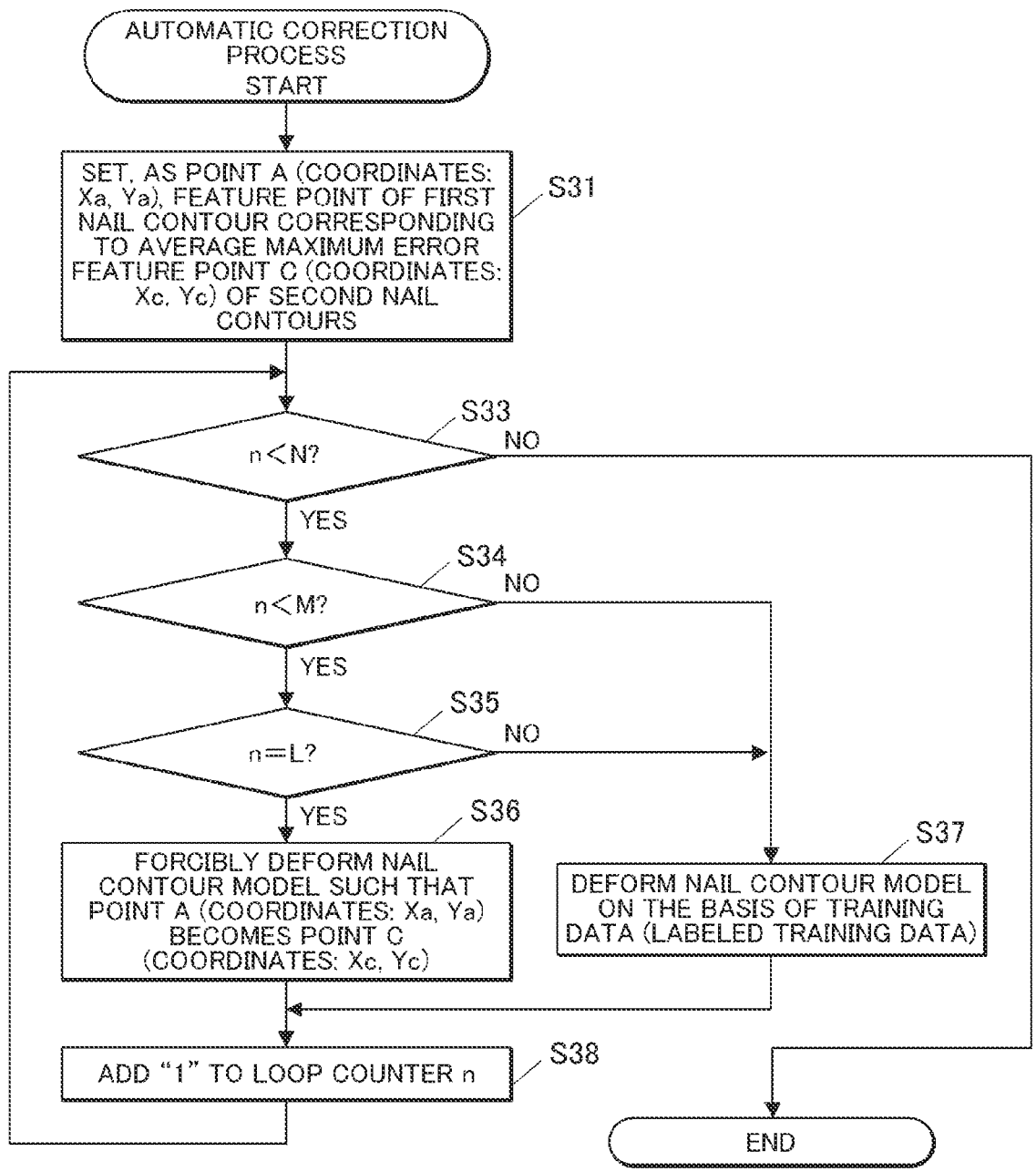
FIG. 12 is a flowchart of an automatic correction process according to the embodiment.

As shown in FIG. 12, when the first nail contour To1, which is detected in Step S3, is subjected to the automatic correction process, first, the contour detector 813 searches the feature points constituting the first nail contour To1 for a feature point A corresponding to the coordinates (Xc, Yc) of the most recently averaged maximum error feature point C of the second nail contour To2 (i.e., average maximum error feature point C of the accumulated second nail contours To2), and sets the position of the found feature point A as (Xa, Ya) (Step S31). The position of the feature point A each time a detection loop is executed can be expressed by "(Xa(n), Ya(n))".

The contour detector 813 then starts the detection loop. The contour detector 813 adds "1" to a loop counter n each time it executes the detection loop.

The contour detector 813 determines whether the loop counter n is less than N that is a preset total number of times of execution of the detection loop (Step S33). If the contour detector 813 determines that the loop counter n is not less than N (Step S33; NO), the contour detector 813 ends the automatic correction process and returns to Step S4 in FIG. 6 to show the detection result of the nail contour to the user to obtain approval and repeats the following steps. How many times the detection loop is executed is arbitrary, but may be "N=1,000", for example.

On the other hand, if the contour detector 813 determines that the loop counter n is less than N (Step S33; YES), the contour detector 813 determines whether the loop counter n is less than M that is equal to or less than half of N (e.g., M=500) (Step S34). If the contour detector 813 determines that the loop counter n is less than M (Step S34; YES), the contour detector 813 determines whether the loop counter n is equal to L that is one of specific numbers (e.g., L=a number every 100, i.e., 100, 200, 300, . . . ) (Step S35). If the contour detector 813 determines that the loop counter n is equal to L (Step S35; YES), the contour detector 813 forcibly deforms the nail contour model (first nail contour To1) such that the point A (coordinates: Xa, Ya) becomes the point C (coordinates: Xc, Yc) (Step S36).

That is, the contour detector 813 forcibly changes the coordinates (Xa, Ya) of the maximum error feature point A of the first nail contour To1, the maximum error feature point A corresponding to the average(d) maximum error feature point C, to the coordinates (Xc, Yc) of the average(d) maximum error feature point C by using the average error ad as the average(d) difference information indicating the magnitude of the error.

Figure 13:
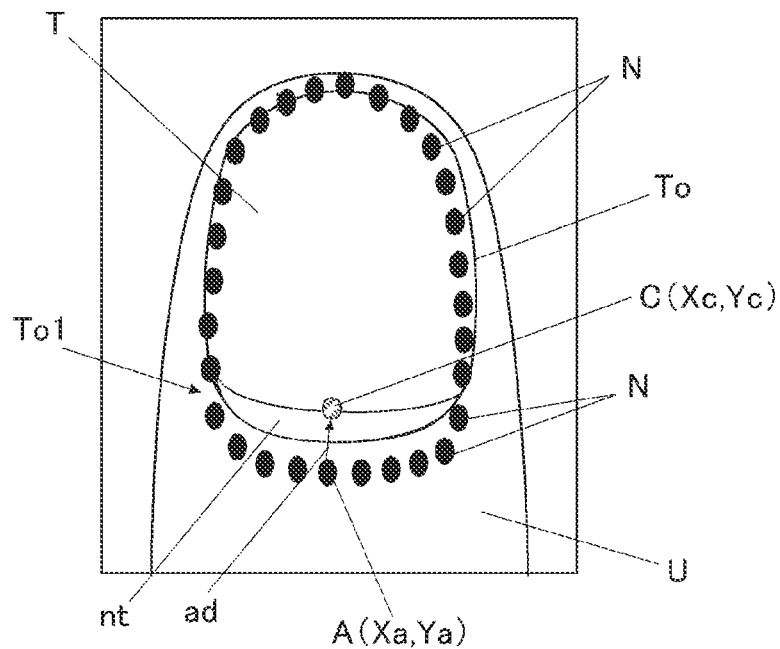
FIG. 13 shows how a feature point of an incorrect first nail contour is forcibly moved to the correct position of the feature point.
Figure 14:
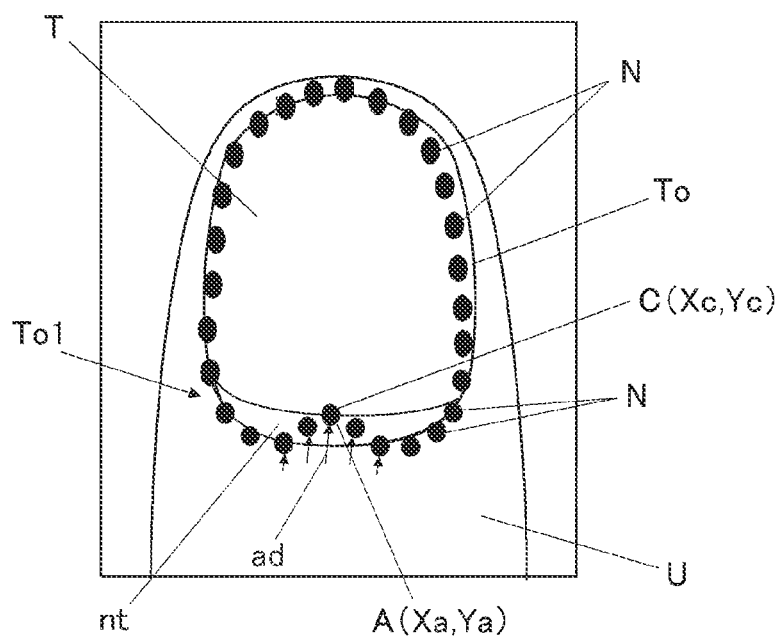
FIG. 14 shows how the feature point of the incorrect first nail contour is forcibly moved to the correct position of the feature point.

FIG. 13 schematically shows how the point A (coordinates: Xa, Ya) is moved to the point C (coordinates: Xc, Yc) on the basis of the average error ad.

As shown in FIG. 13, when the point A (coordinates: Xa, Ya) is drawn to the point C (coordinates: Xc, Yc), as shown in FIG. 14, points located near the point A are moved accordingly by their change amounts that are adjusted in proportion to their distances from the point A. This dynamically deforms the nail contour model, namely, the first nail contour To1, and hence more quickly and appropriately brings it close to the second nail contour To2.

On the other hand, if the contour detector 813 determines that the loop counter n is not less than M (Step S34; NO), or is less than M (Step S34; YES) but not equal to L (Step S35; NO), the contour detector 813 performs the normal detection process of the nail contour To by ESR algorithm, namely, deforms the nail contour model on the basis of training data (Step S37).

This process of deforming the nail contour model on the basis of training data is the same as that described with reference to FIG. 4, and hence its description will be omitted.

After Step S36 or Step S37, the contour detector 813 adds "1" to the loop counter n (Step S38) and returns to Step S33 to repeat Step 33 and the following steps (S33 to S38, i.e., detection loop) until "n=N". This can converge the first nail contour To1 to the correct position that substantially coincides with the contour of the nail region.

When "n=N", the contour detector 813 returns to Step S4 in FIG. 6 to show the detection result to the user to obtain approval and repeats the following steps until the user's approval is obtained.

Use of this method makes it possible to automatically detect the contour of the nail T with high precision, without getting the user to specify or set the nail region by himself/herself.

As described above, according to this embodiment, the contour detection apparatus 1 includes: the imager 5 as the finger image obtaining unit that obtains the finger image FI by imaging the finger U including the nail T; the training data storage area 822 where data of the initial shape To0 is stored, the initial shape To0 being a learning result generated based on training images, constituted of a plurality of feature points N and used to detect the nail contour To; the contour detector 813 that detects the nail contour To (first nail contour To1) defining the region of the nail T from the finger image FI by performing fitting with the initial shape To0; and the input unit 12 that receives an input of the correct nail contour To2 from the user who does not approve the detected nail contour To. The contour detector 813 classifies the first nail contour To1 not approved by the user as a group based on at least the aspect ratio of the nail region defined by the detected first nail contour To1, compares the first nail contour To1 with the second nail contour To2 input by the user, stores the difference information indicating the difference between these two with the aspect ratio, and performs the automatic-and-manual correction process or the automatic correction process using the difference information on another first nail contour To1 that is newly detected and not approved by the user.

This can gradually bring even the nail T the nail contour To of which is difficult to detect, such as a nail T having a unique/rare shape or a nail T a part of the contour line of which is difficult to recognize due the cuticle region nt, close to the second nail contour To2 that the user thinks correct.

The more times the contour detection process is performed, the more the detection results (classified error samples or the like) are accumulated. Thus, the contour detection apparatus 1 is gradually customized to match the features of the user's nails T, and accordingly can save the user the trouble of manually inputting second nail contours To2.

Further, in this embodiment, the contour detector 813 also detects the finger contour Uo defining the region of the finger U from the finger image FI, and classifies the first nail contour To1 as a group based on the area ratio of the nail region defined by the first nail contour To1 to the finger region defined by the finger contour Uo too.

This enables more appropriate classification of the first nail contour To1 in accordance with the geometric properties of the nail T, for example.

Further, in this embodiment, the contour detector 813 performs averaging on the difference information within the group and stores the average(d) difference information.

This makes it easier to reflect the difference information.

Further, in this embodiment, the difference information includes: the information indicating, among the feature points N constituting the first nail contour To1 against which the second nail contour To2 is input, the maximum error feature point A having the largest difference (error) from the second nail contour To2; and the information indicating the magnitude of the difference (error).

This enables effective correction of the first nail contour To1 in accordance with the maximum error feature point A and the difference (error).

Further, in this embodiment, the contour detector 813 performs the automatic-and-manual correction process (first correction process) on each of the first nail contours To1 that the user does not approve and against which the user inputs the second nail contours To2 to classify the first nail contours To1, and in response to a predetermined number or more of the classified first nail contours To1 having been accumulated, the contour detector 813 performs the automatic correction process (second correction process) on another first nail contour To1 that is newly detected and not approved by the user to forcibly change the coordinates of the maximum error feature point A of the another first nail contour To1 having the largest difference from the average of the second nail contours with the information indicating the magnitude of the difference every predetermined number of times of execution of the detection loop (to be more specific, Step 36 and Step 37) in the automatic correction process.

The enables, after a predetermined number or more of error samples have been accumulated, appropriate correction reflecting the user's intent, without getting the user to input the second nail contour To2.

Second Embodiment

Next, with reference to FIG. 15, an example in which the contour detection apparatus of the present disclosure is applied to a printing apparatus (nail printer) that prints nail designs on nails will be described as a second embodiment.

This embodiment is the same as the first embodiment in configuration/component, operation and effect of the contour detection apparatus, and hence their detailed descriptions will be omitted.

Figure 15:
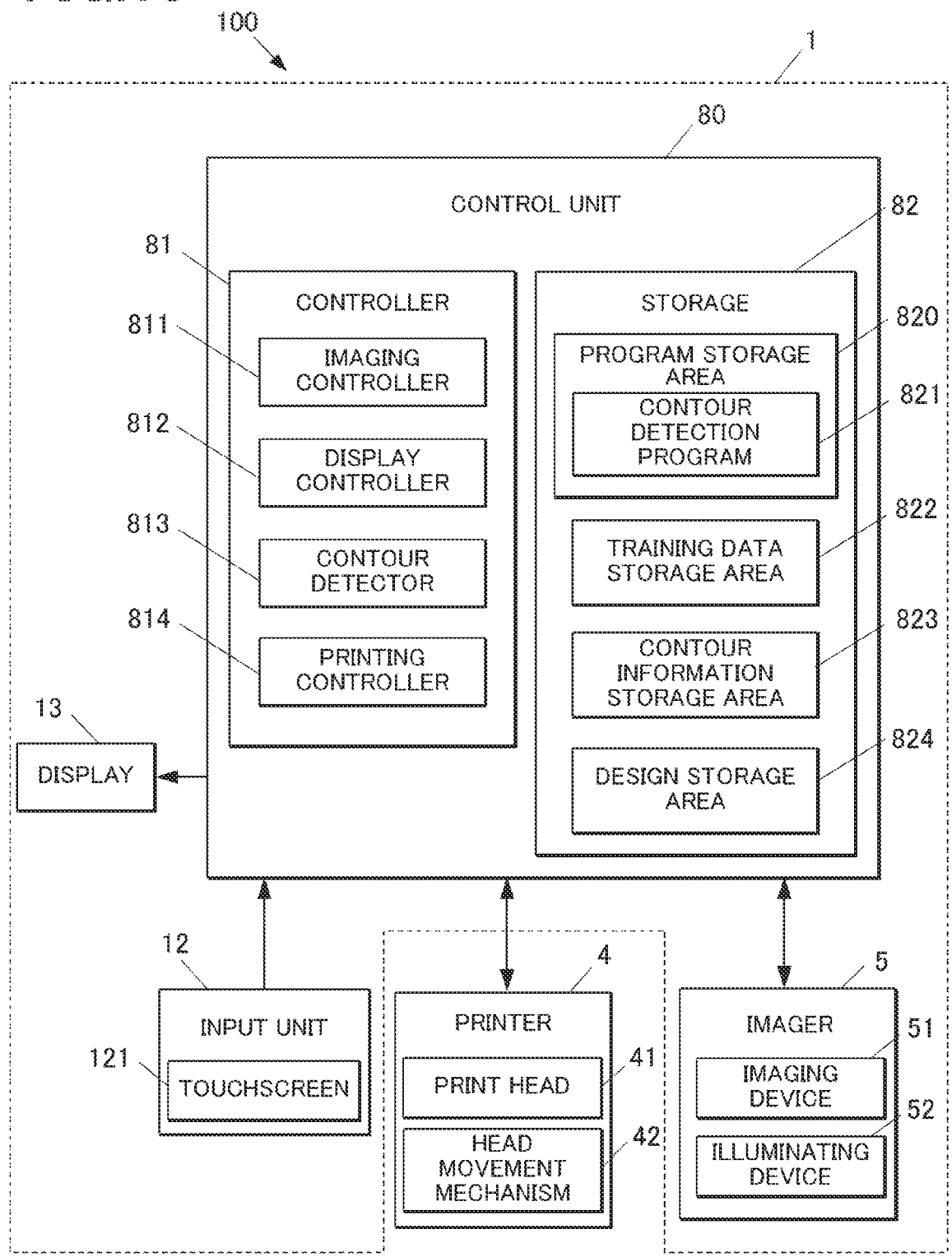
FIG. 15 is a block diagram of a printing apparatus according to an embodiment, showing an example of its control configuration.

FIG. 15 is a block diagram of the main part of a printing apparatus 100 to which the contour detection apparatus 1 is applied, showing an example of functional configuration of the printing apparatus 100.

As shown in FIG. 15, in addition to the components of the contour detection apparatus 1 described in the first embodiment, the printing apparatus 100 includes a printer 4.

The printer 4 includes a print head 41 and a head movement mechanism 42 that moves the print head 41.

In this embodiment, the print head 41 is a head-integrated ink cartridge including not-shown built-in ink reservoirs and an inkjet discharge mechanism that discharges fine droplets of ink to the nail(s) T as a printing target, thereby performing printing on the nail T.

The print head 41 appropriately discharges a predetermined ink(s) under the control of a printing controller 814, thereby performing printing.

The ink reservoirs are provided for cyan (C; CYAN), magenta (M; MAGENTA) and yellow (Y; YELLOW) inks, for example. The inks dischargeable by the print head 41 are not limited to those mentioned above. Ink reservoirs that store inks of other colors may be provided. Further, the print head 41 may be configured to discharge liquid for undercoating, liquid for overcoating and so forth too.

The head movement mechanism 42 includes, for example, a not-shown stepping motor, and is configured to precisely move the print head 41 at every predetermined number of steps. The movement of the print head 41 by the head movement mechanism 42 is controlled by the printing controller 814.

The controller 81 includes the printing controller 814 that controls the printer 4, in addition to those shown in FIG. 3 for the contour detection apparatus 1 of the first embodiment.

The storage 82 includes a design storage area 824, in addition to those shown in FIG. 3 for the contour detection apparatus 1 of the first embodiment.

In the design storage area 824, image data of nail designs printable on the nail T is stored.

The storage 82 may further store information on the contour of the nail T (nail shape, X, Y coordinates of the horizontal position of the nail T, etc.) detected by the contour detector 813 and the inclination angle, curvature and so forth of the nail T, and various types of correction information, for example.

The other components are the same as those of the first embodiment, and hence their descriptions will be omitted by giving the same reference signs to the same components.

Next, a printing control process by the printing apparatus 100 of this embodiment will be described.

In this embodiment, in order to perform printing on the nail T with the printing apparatus 100, first, the user turns on a power source of the printing apparatus 100, and operates a printing start button or the like of the input unit 12. This inputs a printing start instruction corresponding to the operation to the control unit 80 of the printing apparatus 100.

When the printing start instruction is input, the display controller 812 causes the display 13 to display a nail design selection screen to prompt the user to select a nail design.

When the user selects his/her desired nail design with the input unit 12 or the like, a nail design to be printed on the nail T is selected in accordance with the user's selection.

When the nail design is selected, the display controller 812 causes the display 13 to display an instruction screen to instruct the user to place the finger U having the nail T, which is the printing target, at a predetermined position in the finger chamber 3, thereby prompting the user to settle the nail T (and finger U).

In accordance with the instruction, the user inserts the finger U into the finger chamber 3 and positions the nail T (and finger U) by placing the tip of the nail T on the nail rest 35, which is the positioning unit.

The imaging controller 811 causes the imager 5 to image the nail T positioned by the nail rest 35, thereby obtaining the finger image FI including the region of the nail T.

When the finger image FI is obtained, the contour detector 813 performs the contour detection process to detect the nail contour To defining the nail region from the finger image FI. The contour detection process is the same as that described in the first embodiment, and hence its description will be omitted.

When the contour detector 813 detects the nail contour To of the nail T, the contour detector 813 fits the selected nail design to the detected nail contour To and performs appropriate correction, such as curved surface correction, as needed, thereby generating print data (print data of the nail design).

Then, the printing controller 814 outputs the print data to the printer 4, causes the head movement mechanism 42 to operate to appropriately move the print head 41, and also causes the print head 41 to perform printing based on the print data while the head moving mechanism 42 is moving the print head 41. Thus, the printer 4 prints the nail design based on the print data on the nail T.

The other respects are the same as those of the first embodiment, and hence their descriptions will be omitted.

As described above, this embodiment can obtain the same effects as those of the first embodiment, and also obtain the following effects.

That is, in this embodiment, the printing apparatus 100 as the printing apparatus of the present disclosure includes the contour detection apparatus 1 described in the first embodiment. This makes it possible to precisely identify, as a printing area, the nail region of the nail T, the boundary of which with the finger is difficult to detect, without taking much time or troubling the user, and accordingly generate a beautifully finished nail print without ink applied outside the nail region.

Further, the more times the printing apparatus 100 (contour detection apparatus 1) is used, the more the features of the user's nails T are stored, and the more the error samples are accumulated. Thus, the more times the printing apparatus 100 is used, the less the printing apparatus 100 gives the user trouble.

In the above, some embodiments of the present disclosure have been described. It goes without saying, however, that the present disclosure is not limited to these embodiments, but can be modified in various respects in a range of not departing from the scope of the present disclosure.

For example, in the above embodiments, the contour detector 813 uses ESR to fit the initial shape To0 to the region of the nail T, but the algorithm that the contour detector 813 can use to fit the initial shape To0 to the region of the nail T is not limited to ESR.

Examples of the algorithm that the contour detector 813 can use to fit the initial shape To0 to the region of the nail T include AAM (Active Appearance Model), ASM (Active Shape Model) and ACM (Active Contour Model), to which the embodiments or the like are applicable.

Further, in the above embodiments, the contour detection apparatus 1 performs the contour detection process by itself, but may cooperate with an external apparatus, such as a terminal apparatus of any type, and operate in accordance with instructions input from the external apparatus, and/or the external apparatus may perform part or all of the arithmetic processing described above.

The external apparatus is assumed to be a portable terminal apparatus, such as a smartphone or a tablet, or a server or the like, but not limited thereto. The external apparatus is not particularly limited as far as it can communicate with the contour detection apparatus 1 (printing apparatus 100 in the case of the second embodiment). Examples thereof include a laptop PC, a stationary PC, and a terminal apparatus for gaming.

If, as described above, the contour detection apparatus 1 (printing apparatus 100 in the case of the second embodiment) performs various processes in cooperation with an external apparatus, the external apparatus stores programs, such as a program for the contour detection process, various data and so forth in a storage of a control unit thereof.

Further, in the above embodiments, the nail T is the detection target, but the detection target the contour of which is detectable by the contour detection apparatus 1 is not limited to the nail T.

Examples of the detection target include face and parts of the face, such as eyes, nose and mouth.

Further, in the second embodiment, the printing apparatus is the printing apparatus 100 that performs printing on the nail T, but not limited thereto. The printing apparatus may be the one that performs printing on an object other than the nail T. If the printing target is other than the nail T, a contour detection apparatus that detects the contour defining the region of that printing target is applied to the printing apparatus.

Further, in the above, the contour detection apparatus 1 detects the contour of the nail T, and in the second embodiment, after the contour detection apparatus 1 detects the contour of the nail T, the printing apparatus 100 performs printing inside the detected contour. However, the port-processing after the contour detection is not limited to printing. Examples of the post-processing include automatic nail polishing to automatically smooth the surface of the nail T and automatic nail care.

Further, if the detection target is an organ or the like of any type captured in a medical image obtained by a medical imaging apparatus, the post-processing after the contour detection may be image diagnosis by a doctor or the like or provision of information on the health status to a patient, for example.

What is claimed is:

1. A contour detection apparatus comprising at least one processor that
   - detects a first nail contour defining a nail region from a finger image of a finger including a nail by performing fitting with a nail contour model,
   - obtains a second nail contour input from a user against the first nail contour that the user does not approve, and
   - classifies the first nail contour as a group based on dimensional information on dimensions of the first nail contour, and derives difference information indicating a difference between the first nail contour and the second nail contour,
   - wherein the processor performs a correction process with the difference information on another first nail contour that is newly detected and not approved by the user, and the difference information includes: information indicating, among feature points constituting the first nail contour against which the second nail contour is input, a maximum error feature point having a largest difference from the second nail contour; and information indicating a magnitude of the difference.

2. The contour detection apparatus according to claim 1, wherein the processor classifies the first nail contour as the group based on, as the dimensional information, an aspect ratio of the first nail contour.

3. The contour detection apparatus according to claim 1, wherein the processor detects a finger contour defining a finger region from the finger image, and classifies the first nail contour as the group based on, as the dimensional information, an area ratio of the nail region defined by the first nail contour to the finger region defined by the finger contour.

4. The contour detection apparatus according to claim 1, wherein the processor performs averaging on the difference information within the group, thereby deriving average difference information.

5. The contour detection apparatus according to claim 4, wherein the processor performs a correction process with the average difference information on another first nail contour that is newly detected and not approved by the user.

6. The contour detection apparatus according to claim 5, wherein the average difference information includes: information indicating, among feature points constituting the first nail contour against which the second nail contour is input, a maximum error feature point having a largest difference from the second nail contour; and information indicating a magnitude of the difference.

7. The contour detection apparatus according to claim 6,
   - wherein the correction process includes a first correction process and a second correction process,
   - wherein the first nail contour against which the second nail contour is input includes first nail contours against which second nail contours are input,
   - wherein the processor performs the first correction process on each of the first nail contours to classify the first nail contours, and
   - wherein in response to a predetermined number or more of the classified first nail contours having been accumulated, the processor performs the second correction process on the another first nail contour to forcibly change coordinates of the maximum error feature point of the another first nail contour having the largest difference from an average of the second nail contours with the information indicating the magnitude of the difference every predetermined number of times of execution of a detection loop in the second correction process.

8. The contour detection apparatus according to claim 1, wherein the correction process includes a first correction process and a second correction process, wherein the first nail contour against which the second nail contour is input includes first nail contours against which second nail contours are input, wherein the processor performs the first correction process on each of the first nail contours to classify the first nail contours, and wherein in response to a predetermined number or more of the classified first nail contours having been accumulated, the processor performs the second correction process on the another first nail contour to forcibly change coordinates of the maximum error feature point of the another first nail contour having the largest difference from an average of the second nail contours with the information indicating the magnitude of the difference every predetermined number of times of execution of a detection loop in the second correction process.

9. A printing apparatus comprising a printer that performs printing on the nail region defined by the first nail contour detected by the processor of the contour detection apparatus of claim 1.

10. A contour detection method comprising:

detecting a first nail contour defining a nail region from a finger image of a finger including a nail by performing fitting with a nail contour model;

obtaining a second nail contour input from a user against the first nail contour that the user does not approve;

classifying the first nail contour as a group based on dimensional information on dimensions of the first nail contour, and deriving difference information indicating a difference between the first nail contour and the second nail contour; and performing a correction process with the difference information on another first nail contour that is newly detected and not approved by the user, the difference information including: information indicating, among feature points constituting the first nail contour against which the second nail contour is input, a maximum error feature point having a largest difference from the second nail contour; and information indicating a magnitude of the difference.

11. A non-transitory computer-readable storage medium storing a program that causes a processor to:

detect a first nail contour defining a nail region from a finger image of a finger including a nail by performing fitting with a nail contour model;

obtain a second nail contour input from a user against the first nail contour that the user does not approve;

classify the first nail contour as a group based on dimensional information on dimensions of the first nail contour, and derive difference information indicating a difference between the first nail contour and the second nail contour; and perform a correction process with the difference information on another first nail contour that is newly detected and not approved by the user, the difference information including: information indicating, among feature points constituting the first nail contour against which the second nail contour is input, a maximum error feature point having a largest difference from the second nail contour; and information indicating a magnitude of the difference.

* * * * *